United States Patent
Zabaldo (10) Patent No.: US 11,107,138 B2
(45) Date of Patent: Aug. 31, 2021

(54) SYSTEMS FOR PRODUCING MILITARY DECORATION RACKS

(71) Applicant: Jared Zabaldo, Milwaukie, OR (US)

(72) Inventor: Jared Zabaldo, Milwaukie, OR (US)

(*) Notice: Subject to any disclaimer, the term of this patent is extended or adjusted under 35 U.S.C. 154(b) by 238 days.

(21) Appl. No.: 15/902,824

(22) Filed: Feb. 22, 2018

(65) Prior Publication Data
US 2018/0182004 A1 Jun. 28, 2018

Related U.S. Application Data

(62) Division of application No. 13/239,196, filed on Sep. 21, 2011, now abandoned.

(51) Int. Cl.
G06Q 30/00 (2012.01)
G06Q 30/06 (2012.01)
G06Q 20/18 (2012.01)

(52) U.S. Cl.
CPC .......... *G06Q 30/06* (2013.01); *G06Q 20/18* (2013.01)

(58) Field of Classification Search
CPC ................ G06Q 30/06; G06Q 20/18
See application file for complete search history.

(56) References Cited

U.S. PATENT DOCUMENTS

| | | | |
|---|---|---|---|
| 2008/0147512 A1* | 6/2008 | Yankton | G06Q 10/08 705/26.5 |
| 2009/0259553 A1 | 10/2009 | Carroll et al. | |
| 2011/0184780 A1 | 7/2011 | Alderson et al. | |
| 2012/0109777 A1 | 5/2012 | Lipsitz et al. | |

OTHER PUBLICATIONS

EzRackBuilder™—Ultimate Ez Rack Builder Application for Military Rack Building—All Branches, Aug. 1, 2010, available at http://web.archive.org/web/20100801104123/http://www.usamilitarymedals.com/rackbuilder.html?*

Marlow White Military Awards and Decorations, Marlow White, Jul. 13, 2011, available at http://webarchive.org/web/20110713110716/http://www.marlowwhite.com/awards-decorations.html.

(Continued)

*Primary Examiner* — Kathleen Palavecino
(74) *Attorney, Agent, or Firm* — Mohr Intellectual Property Law Solutions, PC (57) ABSTRACT

Methods for producing military decoration racks are described. In one embodiment, the method includes storing regulation data in a data storage unit, receiving user input for creating a military decoration rack design from a user via an input interface of a kiosk, translating the user input into input data, transforming the input data and the regulation data into rack data, producing a visual representation of the military decoration rack, displaying the visual representation to the user, transmitting the rack data to a production facility in electronic communication with the kiosk, and producing the military decoration rack via the production facility. The regulation data may include military decoration rack regulations, the kiosk may include a display unit and a processing unit configured to execute instruction data. The processing unit may be in electronic communication with the data storage unit. The instruction data may include an input module, an arrangement module, and a display module.

23 Claims, 5 Drawing Sheets

(56) References Cited

OTHER PUBLICATIONS

Army Regulation 670-1, Wear and Appearance of Army Uniforms and Insignia, Feb. 3, 2005, available at http://web.archive.org/web/20110716141913/http://www.apd.army.mil/jw2/xmldemo/r670_1/main.asp#p029-12.
Joint Base Andrews Exchange, Aug. 14, 2011, available at http://web.archive.org/web/20110814011042/http://www.shopmyexchange.com/ExchangeLocations/JBAndrewsStore.htm.
Medals of America, [online], [retrieved on Feb. 15, 2012], designing and creating medals display, Retrieved from: http://www.medalsofamerica.com/Category--Military-Medals.

* cited by examiner

SYSTEMS FOR PRODUCING MILITARY DECORATION RACKS

CROSS REFERENCE TO RELATED APPLICATIONS

This application is a Divisional Application of copending U.S. application, Ser. No. 13/239,196, filed on Sep. 22, 2011, which is hereby incorporated by reference for all purposes.

BACKGROUND

The present disclosure relates generally to systems and methods for producing military decoration racks. In particular, systems for producing military decoration racks including kiosks used to electrically communicate data to production facilities are discussed.

Known systems for producing military decoration racks are not entirely satisfactory for the range of applications in which they are employed. For example, military decoration racks are traditionally ordered by working with an agent at an Army and Air Force Exchange Service ("AAFES") store. This often requires the customer to wait for an extended period to speak with an available agent. Additionally, ordering from an agent in this manner provides the user with little visual feedback corresponding to their order. This, combined with possible human error on the part of the agent, may lead to rack design and/or production errors. When errors do occur, the current system often produces inadequate records, as no electronic confirmation of the orders are produced for the customer.

Additionally, AAFES agents often struggle to provide the accurate price of a completed rack to a customer. This often occurs because the ordering process is complex and manually keeping track of an accurate price as the rack is modified is difficult. Notably, AAFES agents generally lack any automated systems that tabulate the price of the completed rack as the rack is designed. As another issue, current systems are not adept at segregating costs for each individual rack; this also results from the lack of automated billing in the AAFES ordering process.

Traditional rack ordering methods also unsatisfactory use AAFES agents as middle men for the ordering process without any direct communication between the customer and the rack supplier. Traditional rack ordering methods also result in communication errors and may lead to improper orders being submitted. AAFES agents also must provide customer service for issues beyond the ordering process, such as dealing with repairs and returns, which is troublesome, as AAFES are often unsuited or unable to handle these post-sale customer service issues.

Other known systems may implement software methods for arranging the rack. For example, the EZ RACK BUILDER system provided at http://www.ezrackbuilder.com/ implements a software method to produce military racks. However, the EZ RACK BUILDER system is not completely satisfactory and can be improved upon. Although EZ RACK BUILDER serves as a useful tool for an individual, it is designed for use on a home computer. A user at home is not afforded any in-person assistance to help them design their rack at the point of sale, as is available when purchasing from an AAFES agent.

Thus, there exists a need for systems for producing military decoration racks that improve upon and advance the design of known systems for producing military decoration racks. Examples of new and useful systems for producing military decoration racks relevant to the needs existing in the field are discussed below.

SUMMARY

The present disclosure is directed to systems for producing military decoration racks, the systems including military related retail spaces, storage units that store regulation data corresponding with military decoration rack regulations and instruction data. The systems additionally include kiosks within the military related retail space and in electrical communication with the storage units, the kiosks including display units, input interfaces, and communication units. The systems also include processing units configured to execute instruction data and production facilities in electronic communication with the kiosks configured to receive rack data from the kiosks and produce military decoration racks based upon received rack data. The instruction data includes input modules, arrangement models, display modules, and communication modules.

Methods for producing military decoration racks are described. In one embodiment, the method includes storing regulation data in a data storage unit, receiving user input for creating a military decoration rack design from a user via an input interface of a kiosk, translating the user input into input data, transforming the input data and the regulation data into rack data, producing a visual representation of the military decoration rack, displaying the visual representation to the user, transmitting the rack data to a production facility in electronic communication with the kiosk, and producing the military decoration rack via the production facility. The regulation data may include military decoration rack regulations, the kiosk may include a display unit and a processing unit configured to execute instruction data. The processing unit may be in electronic communication with the data storage unit. The instruction data may include an input module, an arrangement module, and a display module.

DETAILED DESCRIPTION

The disclosed systems will become better understood through review of the following detailed description in conjunction with the figures. The detailed description and figures provide merely examples of the various inventions described herein. Those skilled in the art will understand that the disclosed examples may be varied, modified, and altered without departing from the scope of the inventions described herein. Many variations are contemplated for different applications and design considerations; however, for the sake of brevity, each and every contemplated variation is not individually described in the following detailed description.

Throughout the following detailed description, examples of various systems are provided. Related features in the examples may be identical, similar, or dissimilar in different examples. For the sake of brevity, related features will not be redundantly explained in each example. Instead, the use of related feature names will cue the reader that the feature with a related feature name may be similar to the related feature in an example explained previously. Features specific to a given example will be described in that particular example. The reader should understand that a given feature need not be the same or similar to the specific portrayal of a related feature in any given figure or example.

Figure 1:
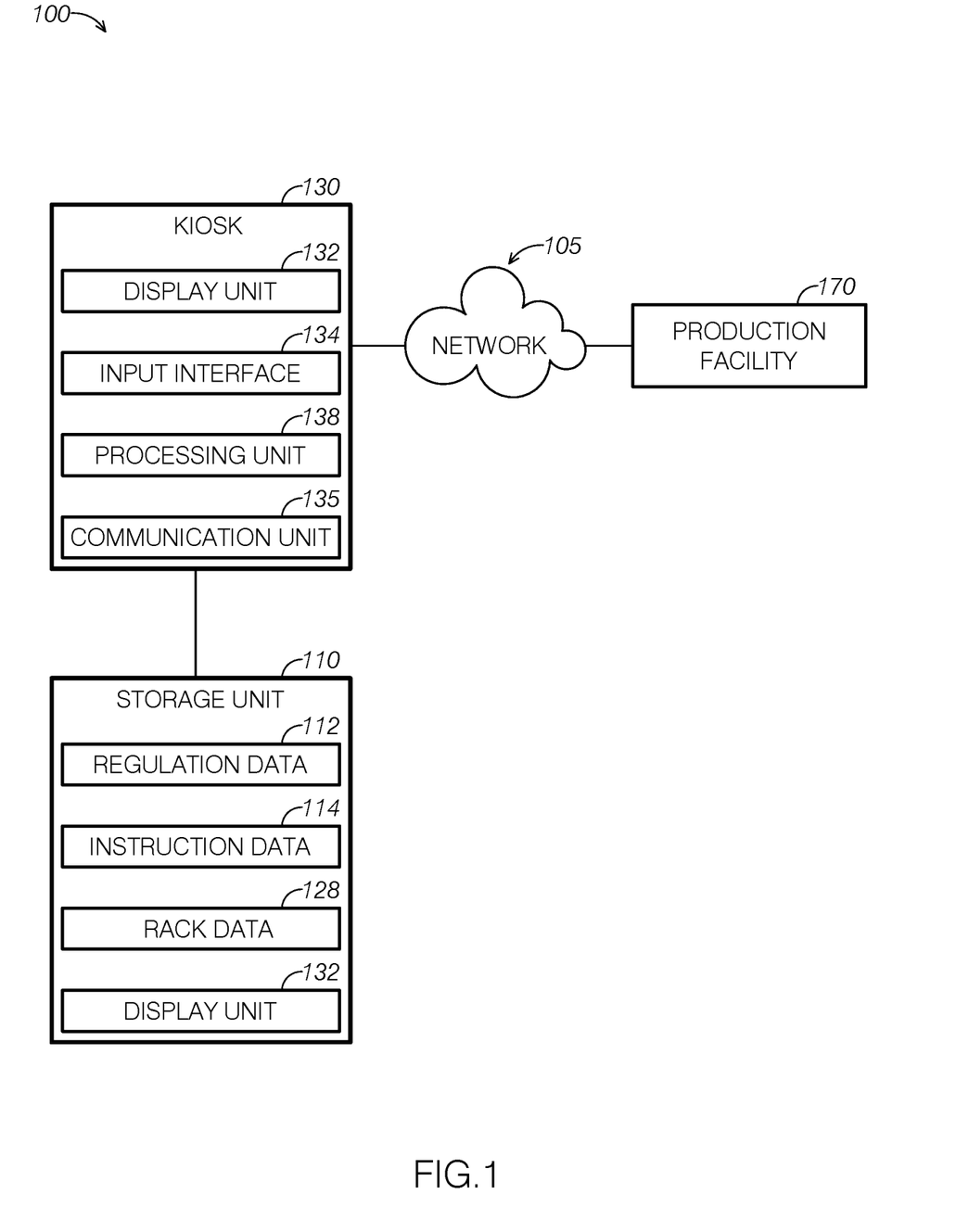
FIG. 1 is a schematic of a first example of a system for producing military decoration racks.

With reference to FIGS. 1-4, a first example of a system for producing military decoration racks, system for producing military decoration racks 100, will now be described. As FIG. 1 illustrates, system for producing military decoration racks 100 includes a storage unit 110, a kiosk 130, and a production facility 170. System for producing military decoration racks 100 is configured to design decoration racks for the United States Armed Forces by default, but may be configured to produce award racks and/or other similar displays for armed forces other than the United States military. Likewise, the system may be configured to produce award racks for non-military contexts.

By placing a decoration rack design kiosk, such as kiosk 130, in the AAFES store, many of the aforementioned problems with the existing AAFES system of ordering medal racks are mitigated. First, by implementing one or more kiosks within a retail space, the need to speak to an agent is greatly reduced. Additionally, the kiosks provide ample visual feedback throughout the design process. Because the kiosk stores electronic records, customers can retrieve records in case of an error.

By accessing updateable online information and keeping accurate records of per-transaction pricing, the kiosk in the retail space ensures accurate pricing of orders.

Additionally, kiosks similar to those disclosed are configured to communicate orders directly to the rack supplier. This reduces communication errors on the part of AAFES agents. Additionally, this direct line of communication may be used for service and repair purposes, avoiding the need for AAFES to provide customer service for issues beyond the ordering process.

Figure 4:
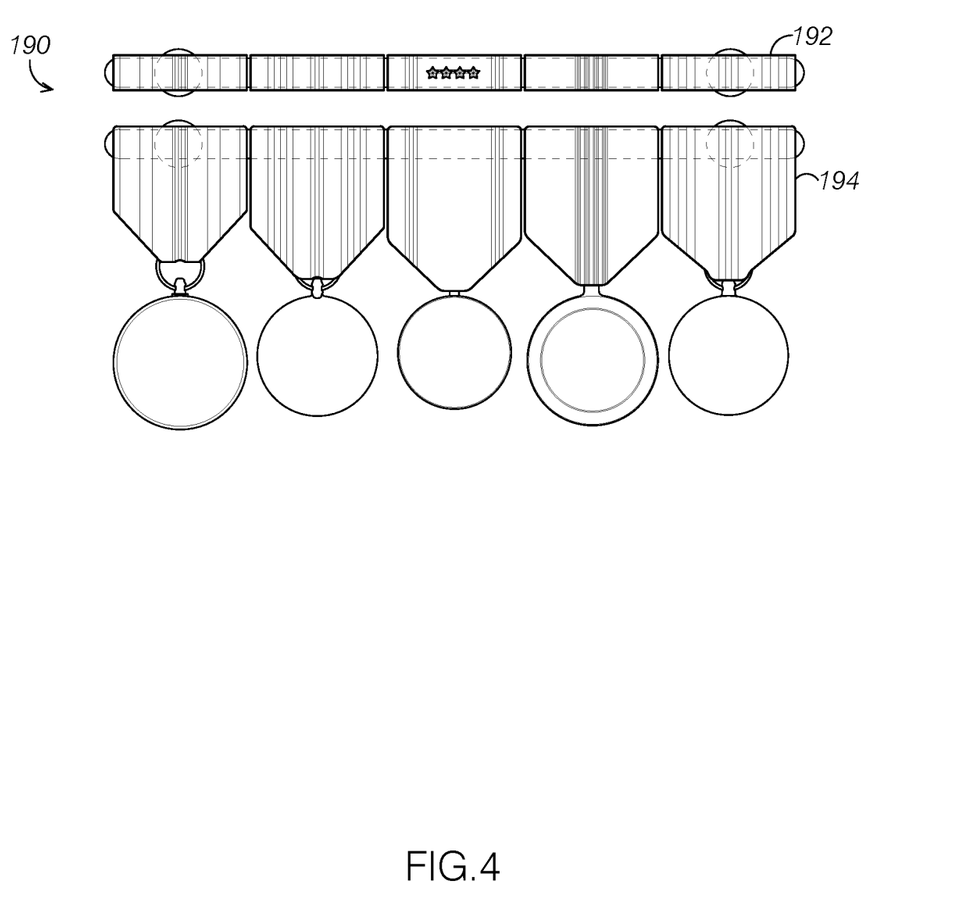
FIG. 4 is a front view of an example of a military decoration rack in which the system shown in FIG. 1 is capable of producing.

FIG. 4 illustrates an example of a decoration rack, rack 190, that system 100 is configured to design. As FIG. 4 shows, rack 190 includes a ribbon 192 and a medal 194. System 100 is configured to produce decoration racks that include medals, ribbons, any other common military decoration, or any combination thereof.

Figure 2:
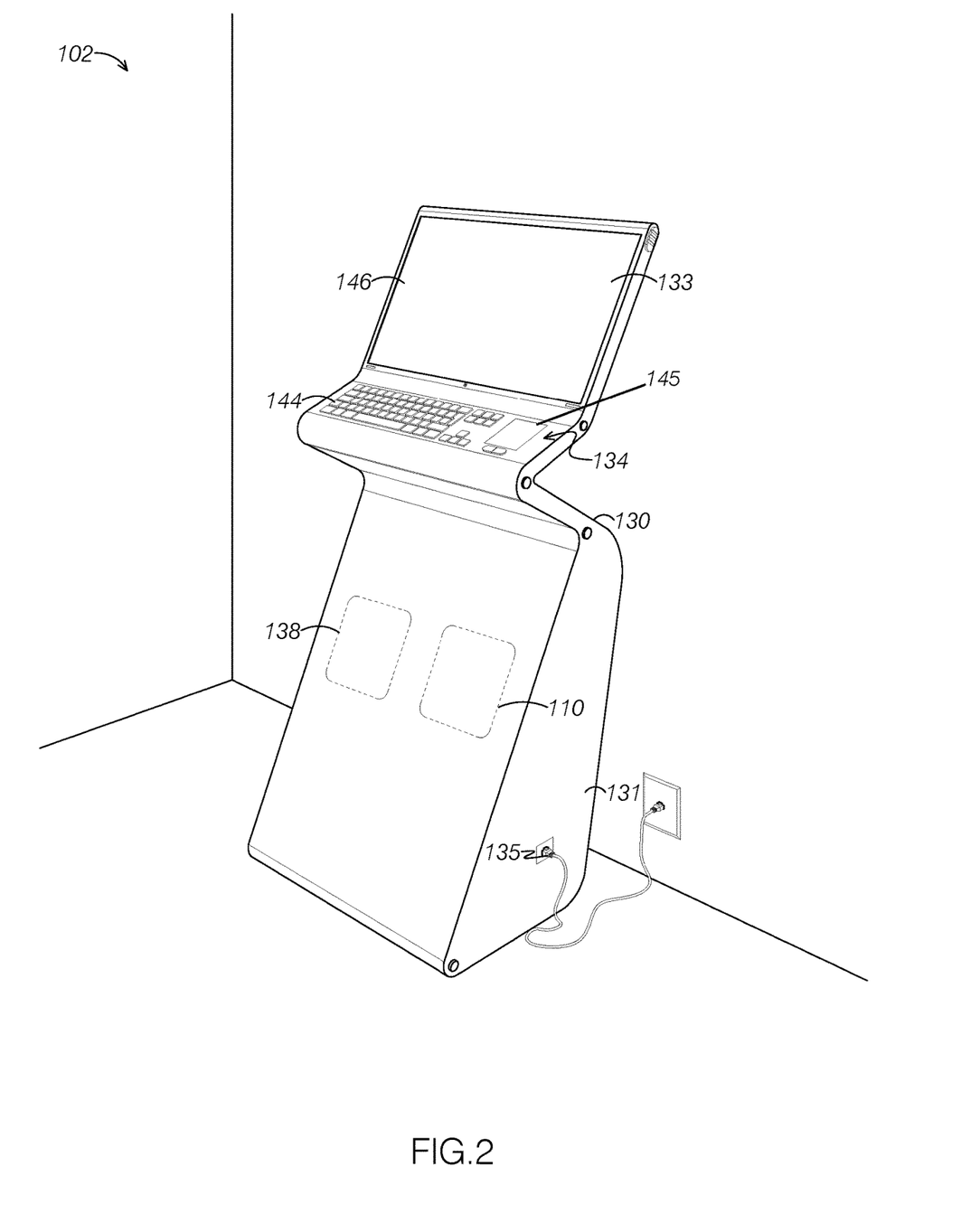
FIG. 2 is a perspective view of a kiosk within a military related retail space being used by the system shown in FIG. 1.

As FIG. 2 illustrates, system for producing military decoration racks 100 includes a kiosk 130 present in a military related retail space 102. Military related retail space 102 defines an AAFES store located on a military base within the United States. However, suitable retail spaces include those not affiliated with the United States Armed Forces or the United States government. In some examples, kiosks may be present in retail spaces outside the United States. In other examples, kiosks may be present in retail spaces related to armed forces of other than the United States Armed Forces. In yet other examples, kiosks may be present within retail spaces related to the military other than AAFES stores, including other locations within a military base.

Placing kiosk 130 in military related retail space 102 confers a user with benefits compared to using similar systems in other locales. For example, the user has the opportunity to consult employees and/or agents of the retail space as they design their rack. This may make their ordering process more efficient. Additionally, placing kiosks in AAFES stores provides the benefit of grouping the military decoration rack point of purchase with that of other military related purchases.

Placing kiosks in military related retail spaces additionally may additionally provide the military related retail spaces a revenue stream. For example, the retail space may be able to strike a fee agreement whereby the kiosk owner allows the owner to lease space in which the kiosk is to be placed. Additionally, the placement of kiosks in military related retail spaces provides the proprietors of systems with an avenue for marketing their system.

As FIG. 2 illustrates, kiosk 130 is located within a military related retail space 102. FIG. 2 shows that kiosk 130 includes a display unit 132, an input interface 134, a communication unit 135, and a processing unit 138. As FIG. 2 illustrates, kiosk 130 additionally defines an enclosure 131.

As FIG. 2 shows, display unit 132 defines an electronic display attached to enclosure 131 and includes a screen 133. As FIG. 2 illustrates, display unit 132 additionally includes a touchscreen 146 configured to receive user input in response to a user's interaction with the screen.

Figure 3:
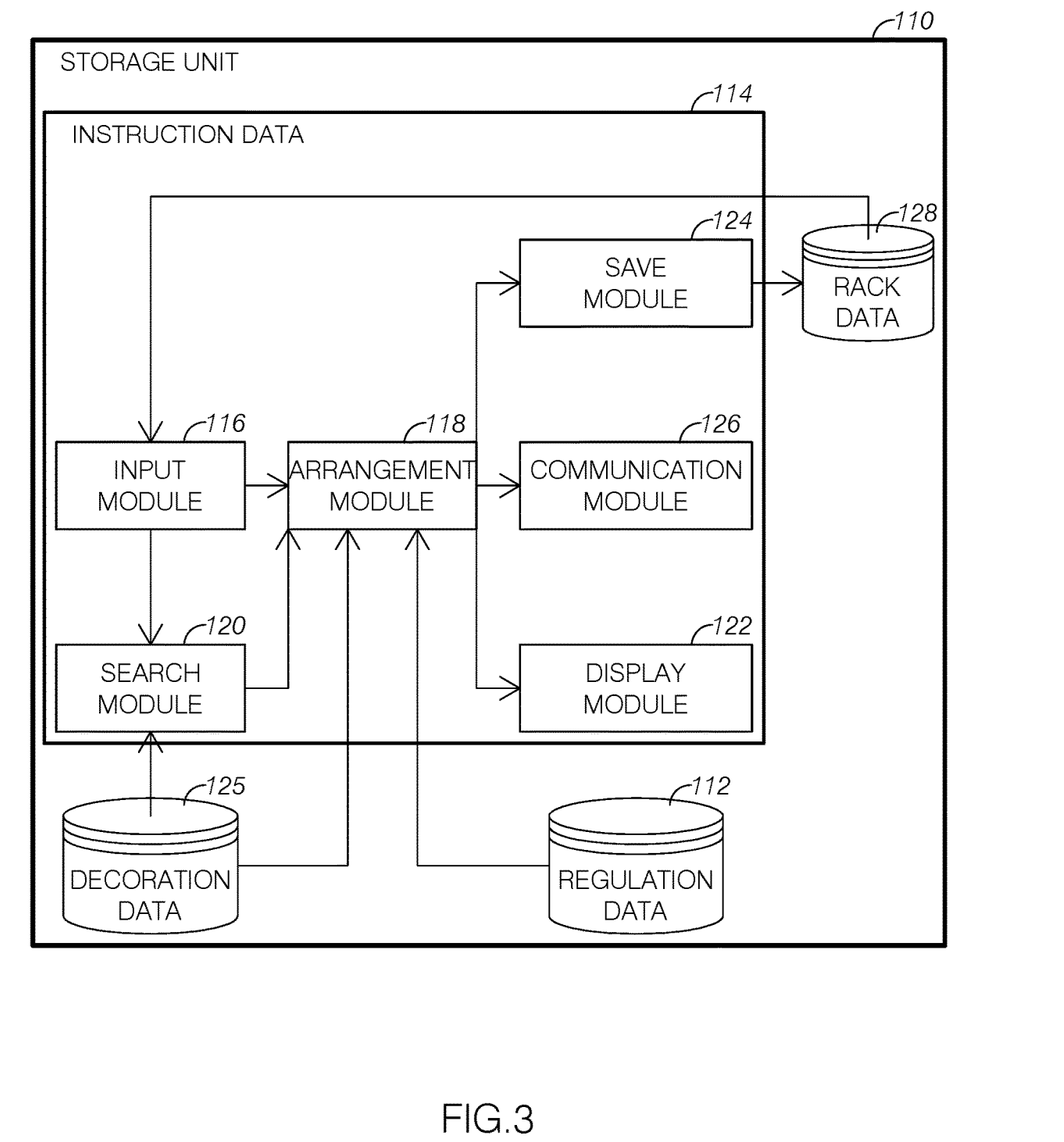
FIG. 3 is a schematic view of a storage unit used by the system shown in FIG. 1 with instruction data shown in detail.

As FIG. 2 illustrates, input interface 134 includes the elements of kiosk 130 configured to respond to a user's interaction. As FIG. 3 shows, kiosk 130 is configured to communicate this interaction to input module 116. As FIG. 2 shows, input interface 134 includes a keyboard 144, a pointing device 145, and touchscreen 146.

With reference to FIG. 2, processing unit 138 defines a computer processor contained in kiosk 130. Processing unit 138 is configured to execute instruction data 114 received from storage unit 110. More specifically, processing unit 138 is configured to receive instruction data 114 from storage unit 110 and perform the instructions encoded in the received instruction data. Processing unit 138 is additionally capable of communicating with storage unit 110 and external computer networks, including the internet. As a result, processing unit 138 may communicate with remote and local memory/storage as it executes instruction data.

As FIG. 2 illustrates, communication unit 135 defines a network interface configured to be electronically to a computer network via a wire. Communication unit 135 is configured to receive data from the storage unit and to transmit data to the production facility. More specifically, communication unit 135 is configured to transmit rack data over a computer network, which may define the internet in some contexts.

As FIG. 2 illustrates, storage unit 110 defines electronic data storage in electrical communication with kiosk 130. More precisely, storage unit 110 defines a hard drive contained within enclosure 131. As FIG. 3 illustrates, storage unit 110 electronically stores regulation data 112, instruction data 114, decoration data 125, and rack data 128. The data stored by storage unit 110 is used by kiosk 130 to generate and/or save rack data corresponding to input data transmitted to kiosk 130 by a user. Storage unit 110 is configured to update any of the contained data without physically manipulating kiosk 130. As a result, kiosk 130 may be configured to access updated regulation data, instruction data, decoration data, and rack data.

Decoration data 125 is a dataset that corresponds to the decorations supported by system 100. For example, decoration data in systems within the United States include all military decorations which recognize service and personal accomplishments while a member of the United States armed forces. Decoration data 125 includes data corresponding to medals and ribbons, similar to medal 194 and ribbon 192 shown on rack 190 in FIG. 4. As previously mentioned, decoration data 125 may automatically be updated on storage unit 110 without manually updating of kiosk 130.

Regulation data 112 includes data corresponding to the proper arrangement of decorations according to relevant regulations. For example, for systems used within the United States, regulation data 112 includes data corresponding to awards sections for U.S. Army AR 670-1, U.S. Marine Corps MCO P1020.34G, U.S. Navy Uniform Regulations, U.S. Air Force AFI 36-293, and U.S. Coast Guard COMDTINST M1020.6E. As previously mentioned, decoration data 125 may be updated automatically on storage unit 110 without manually updating of kiosk 130.

Rack data 128 is a dataset that corresponds to a selected set of decorations included on a designed or partially designed rack. Rack data 128 includes data that corresponds to an arranged rack, similar to rack 190, and includes data corresponding to medals and ribbons selected from decoration data 125 arranged according to regulation data 112.

Instruction data 114 defines a collection of computer instructions electronically stored on storage unit 110. Instruction data 114 may include instructions stored in any computer-readable format, and may comprise instructions stored in binary and/or text-based files. Instruction data 114 is described herein as having a collection of modules that are configured to perform particular functions. However, there is no requirement for the code to be stored and/or executed in such a segregated manner. Individual files, programs, executables, scripts, or other instructions sent to processing unit 138 may be configured to perform multiple modules, such as those described below, either in whole or in part.

With reference to FIG. 3, instruction data 114 includes an input module 116, an arrangement module 118, a search module 120, a display module 122, a save module 124, and a communication module 126.

Input module 116 is configured to receive user input from the input interface and/or rack data previously saved to storage unit 110. Input module 116 translates the user input to input data that is compatible with arrangement module 118.

Input module 116 may retrieve input data from remote data sources, such as sources remotely accessible through computer networks. This disclosure specifically contemplates input modules that may retrieve data entered at other kiosks or data entered within other compatible software systems.

Arrangement module 118 is configured to translate the input data into rack data that defines a military decoration rack arranged according to regulation data 112. More specifically, arrangement module 118 selects decorations from decoration data 125, the decorations potentially including medals and/or ribbons, and arranges the decorations into a particular order that conforms with regulation data 112.

Display module 122 is configured to display a visualization on display unit 132 corresponding to a rack currently being designed. Display module 122 updates the display data upon arrangement module 118 to produce new rack data 128 and retransmits the updated display data to display unit 132. As a result, a user is presented with a graphical representation of their arranged rack that is updated in real-time in response to their input. Display module 122 is additionally configured to generate a user interface that provides elegant instruction as to how the user should interact with input interface 134.

Search module 120 is configured to use the input data to select decoration data from the storage unit and add the selected decoration data to the rack data. Search module 120 uses input data and display unit 132 to allow a user to more simply select from the contents of decoration data 125. For example, search module 120 may display a visualization of a decoration on display unit 132 in response to a user entering a partial description of a decoration referenced in decoration data 125.

Communication module 126 is configured to communicate rack data produced by arrangement module 118 to production facility 170 via communication unit 135 upon an indication that the rack data is complete and requires no further updating prior to production. At the time that communication module 126 communicates the rack data, it may additionally provide the user with electronic confirmation of the order. In examples connected to the internet, this may be accomplished by automatically sending an e-mail to the customer's e-mail address.

By allowing a user to control the process of ordering decoration racks from the beginning of the process to the communication of the order to production facility 170, system for producing military decoration racks 100 confers several benefits to the user. For example, by displaying display data responsive to selectively updated rack data, users are able to view their rack as they create it. Compared to waiting for an available agent at a participating retail space, a current common method of decoration rack design, system 100 provides an easier and faster method of ordering a decoration rack. In particular, this provides users with the ability to personally create their racks within a military related retail space without the time-consuming process of waiting for an available agent and working through a design without adequate visualizations of the completed rack.

Additionally, by producing updated visual representations of a rack while designing the rack and delivering the rack data directly to production facility 170, system for producing military decoration racks 100 lessens the chance of mistake in the design and submission process. This is true in cases wherein the user is assisted by an agent of the military related retail space and in cases where the user is unassisted.

Save module 124 is configured to store a user's current rack to storage unit 110 or an external electronic storage medium at a selected point during design. Save module 124 is specifically configured to connect to external systems over a computer network, which may define the internet, to store a user's current rack data. Save module 124 produces an electronic copy of a user's rack data, which may be retrieved at a later date to complete a partially completed design. This saved rack data may also be used when a user earns additional decorations. By saving an electronic copy, save module 124 lessens the risk of loss that results from producing physical copies alone. Additionally, save module 124 allows a user to access her rack data from compatible kiosks and/or other compatible terminals aside from the specific one in which she began the design process.

As FIG. 1 illustrates, kiosk 130 is in data communication with production facility 170. More precisely, communication module 126 is configured to transmit rack data generated by arrangement module 118 to production facility 170 upon a user determining the rack data is sufficiently arranged to begin production. As FIG. 1 illustrates, production facility 170 is in data communication with kiosk 130 through a computer network, wherein arranged rack data is transmitted digitally to production facility 170. Production facility 170 is at a different location than kiosk 130, and communication module 126 is configured to electronically communicate over the computer network to production facility 170's remote location.

However, this disclosure additionally contemplates production facilities proximate the kiosk, and specifically contemplates production facilities physically connected to the kiosk. In such examples, a device connected to the kiosk may provide a user with an arranged rack at nearly the same time and location to where the user entered input data into the kiosk.

Figure 5:
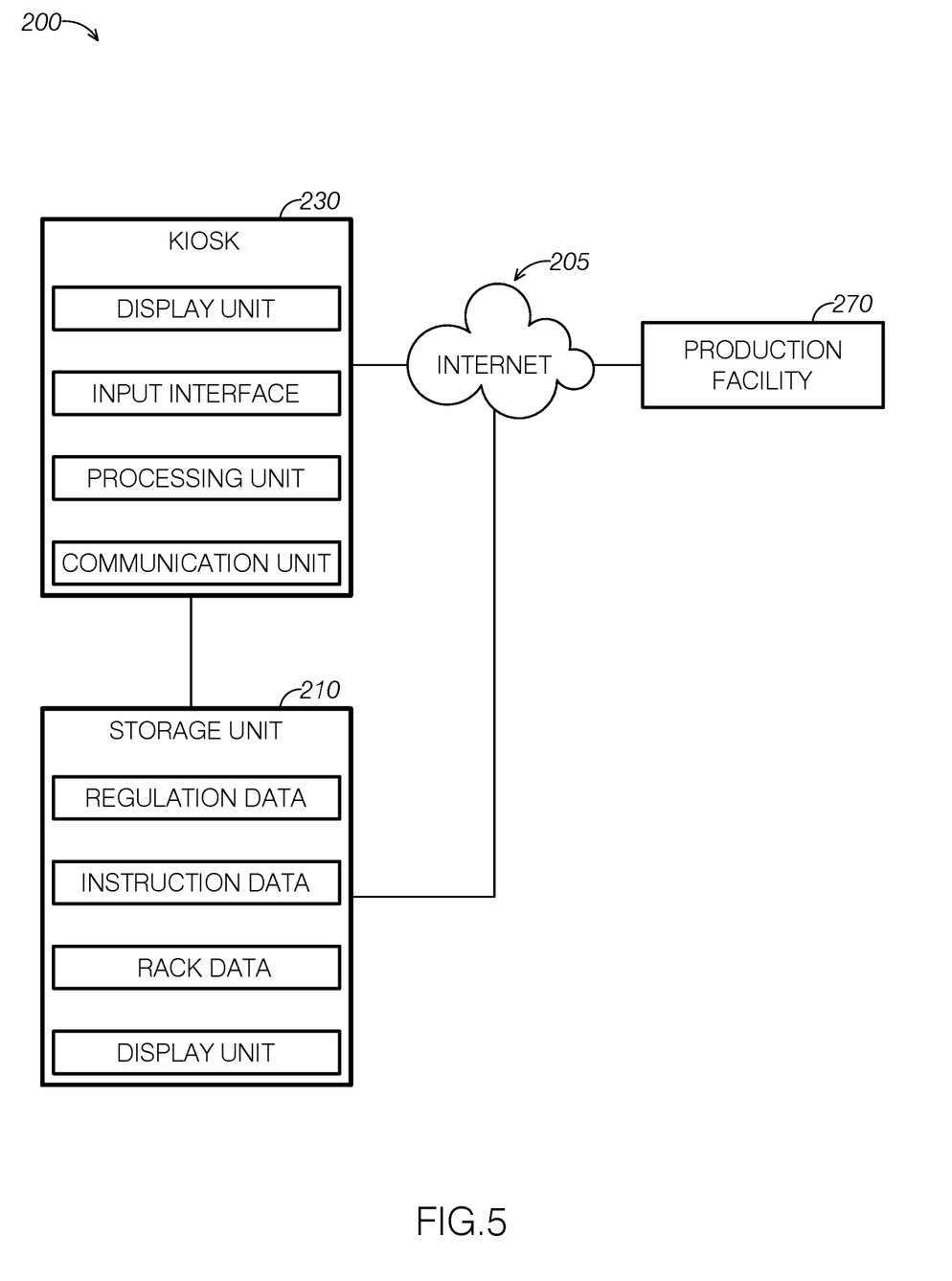
FIG. 5 is a schematic of a second example of a system for producing military racks.

With reference to FIG. 5, a second example of a system for producing military decoration racks, system for producing military decoration racks 200, will now be described. System for producing military decoration racks 200 is substantially similar to system for producing military decoration racks 100 and includes a kiosk 230, storage unit 210, and a production facility 270, each substantially similar to the corresponding elements of system for producing military decoration racks 100. A difference between system 200 and system 100 is seen in the way storage unit 210 is connected to kiosk 230. Rather than being directly connected to the kiosk, storage unit 210 is connected to kiosk 230 over the internet. Kiosk 230 is configured to retrieve data from storage unit 210, including instruction data, and execute and/or manipulate that data locally. Specifically, kiosk 230 includes an internet browsing application configured to retrieve the data, allow the kiosk to process the data locally, and then output rack data to production facility 270.

The disclosure above encompasses multiple distinct inventions with independent utility. While each of these inventions has been disclosed in a particular form, the specific embodiments disclosed and illustrated above are not to be considered in a limiting sense as numerous variations are possible. The subject matter of the inventions includes all novel and non-obvious combinations and subcombinations of the various elements, features, functions and/or properties disclosed above and inherent to those skilled in the art pertaining to such inventions. Where the disclosure or subsequently filed claims recite "a" element, "a first" element, or any such equivalent term, the disclosure or claims should be understood to incorporate one or more such elements, neither requiring nor excluding two or more such elements.

Applicant(s) reserves the right to submit claims directed to combinations and subcombinations of the disclosed inventions that are believed to be novel and non-obvious. Inventions embodied in other combinations and subcombinations of features, functions, elements and/or properties may be claimed through amendment of those claims or presentation of new claims in the present application or in a related application. Such amended or new claims, whether they are directed to the same invention or a different invention and whether they are different, broader, narrower or equal in scope to the original claims, are to be considered within the subject matter of the inventions described herein.

The invention claimed is:

1. A method for producing military decoration racks at a military decoration rack kiosk, the method comprising:
    storing regulation data in a data storage unit that is residing in the military decoration rack kiosk, the regulation data comprising military decoration rack regulations that define a proper arrangement of specified decorations according to relevant military regulations;
    storing decoration data in the data storage unit, the decoration data comprising information defining at least all United States military decorations;
    receiving user input at the military decoration rack kiosk that specifies a plurality of military ribbons or military medals, wherein the specified plurality of military ribbons and the military medals are used for creating a military decoration rack design, wherein the specification of the plurality of military ribbons and the military medals are received from a user via an input interface of the military decoration rack kiosk, and wherein the military decoration rack kiosk receives the user input that specifies the plurality of military ribbons and the military medals that are to be incorporated into a military decoration rack that is to be generated based on the user input received at the military decoration rack kiosk, the military decoration rack kiosk further comprising:
        a military decoration rack kiosk display unit; and
        a military decoration rack processing unit configured to execute instruction data that has been stored at the data storage unit;
        wherein the military decoration rack processing unit is in electronic communication with the data storage unit;
        wherein the instruction data includes an input module, an arrangement module, and a display module;
    transmitting the decoration data corresponding to the user specified plurality of military ribbons and the military medals from the data storage unit to the military decoration rack processing unit;
    transmitting the instruction data from the data storage unit to the military decoration rack processing unit;
    translating, at the military decoration rack processing unit executing the received instruction data via the input module under execution of the military decoration rack processing unit, the user input into input data;
    transforming, via the arrangement module under execution of the military decoration rack processing unit, the input data, the decoration data, and the regulation data into rack data that defines a military decoration rack corresponding to the user input that specifies the plurality of military ribbons and the military medals;
    producing, via the display module under execution of the military decoration rack processing unit, a visual representation of the military decoration rack;
    displaying, via the military decoration rack display unit of the military decoration rack kiosk the visual representation to the user; and
    transmitting the rack data from the military decoration rack kiosk to a production facility in electronic communication with the military decoration rack kiosk;
    wherein the military decoration rack is later produced at the production facility based on the rack data received from the military decoration rack kiosk.

2. The method of claim 1, wherein the production facility is located remote of the military decoration rack kiosk.

3. The method of claim 1, wherein the production facility is located proximal the military decoration rack kiosk.

4. The method of claim 1, wherein the transmitting step comprises:
    transmitting the rack data via a communication module of the military decoration rack kiosk.

5. The method of claim 1, comprising:
    receiving additional user input;
    revising, in response to the additional user input, the rack data;
    producing a revised visual representation of the military decoration rack;
    displaying the revised visual representation to the user.

6. The method of claim 1, comprising:
storing the input data in a data storage unit in electronic communication with the military decoration rack kiosk.

7. The method of claim 6, wherein the military decoration rack kiosk is a first military decoration rack kiosk, the method comprising:
retrieving the input data from a second military decoration rack kiosk in electronic communication with the data storage unit.

8. The method of claim 1, further comprising:
displaying a visualization of a decoration on the military decoration rack display unit in response to the user entering a partial description of the specified plurality of military ribbons and the military medals referenced in decoration data.

9. A method for producing military decoration racks at a military decoration rack kiosk, the method comprising:
storing regulation data in a data storage unit that is remote from the military decoration rack kiosk, the regulation data comprising military decoration rack regulations corresponding to the proper arrangement of decorations according to relevant military regulations;
storing decoration data in the data storage unit, the decoration data comprising information defining at least all United States military decorations;
receiving user input at the military decoration rack kiosk that specifies a plurality of military ribbons or military medals, wherein the specified plurality of military ribbons and the military medals are used for creating a military decoration rack design, wherein the specification of the plurality of military ribbons and the military medals are received from a user via an input interface of a military decoration rack kiosk located in a military related retail space, and wherein the military decoration rack kiosk receives the user input that specifies the plurality of military ribbons and the military medals that are to be incorporated into a military decoration rack that is to be generated based on the user input received at the military decoration rack kiosk, the military decoration rack kiosk further comprising:
a military decoration rack display unit; and
a military decoration rack processing unit configured to execute instruction data that has been stored at the data storage unit;
wherein the military decoration rack processing unit is in electronic communication with the data storage unit;
wherein the instruction data includes an input module, an arrangement module, and a display module;
transmitting the instruction data and the decoration data from the data storage unit to the military decoration rack kiosk;
translating, at the military decoration rack processing unit executing the received instruction data via the input module under execution of the military decoration rack processing unit, the user input into input data that specifies the plurality of military ribbons and the military medals;
transforming, via the arrangement module under execution of the military decoration rack processing unit, the input data, the decoration data, and the regulation data into rack data that defines a military decoration rack corresponding to the user input;
communicating the rack data from the storage unit to the military decoration rack display unit;
generating, at the military decoration rack kiosk, a visual representation of the military decoration rack based upon the rack data;
producing, via the display module under execution of the military decoration rack processing unit, the visual representation of the military decoration rack;
displaying, via the display unit of the military decoration rack kiosk, the visual representation of the military decoration rack that has been generated by the military decoration rack processing unit of the military decoration rack kiosk to the user; and
transmitting, via a communication module of the military decoration rack kiosk, the rack data from the military decoration rack kiosk to a production facility in electronic communication with the military decoration rack kiosk;
wherein the military decoration rack is later produced at the production facility based on the rack data received from the military decoration rack kiosk.

10. The method of claim 9, wherein the production facility is located remote of the military decoration rack kiosk.

11. The method of claim 9, wherein the production facility is located proximal the military decoration rack kiosk.

12. The method of claim 9, comprising:
receiving additional user input;
revising, in response to the additional user input, the rack data;
producing a revised visual representation of the military decoration rack;
displaying the revised visual representation to the user.

13. The method of claim 9, comprising:
storing the input data in a data storage unit in electronic communication with the military decoration rack kiosk.

14. The method of claim 13, wherein the military decoration rack kiosk is a first kiosk, the method comprising:
retrieving the input data from a second military decoration rack kiosk in electronic communication with the data storage unit.

15. The method of claim 9, further comprising:
displaying a visualization of a decoration on the military decoration rack display unit in response to the user entering a partial description of the specified plurality of military ribbons and the military medals referenced in decoration data.

16. A method for producing military decoration racks at a military decoration rack kiosk, the method comprising:
storing regulation data in a data storage unit, the regulation data comprising military decoration rack regulations that define a proper arrangement of specified decorations according to relevant military regulations;
storing decoration data in the data storage unit, the decoration data comprising information defining at least all United States military decorations;
receiving user input at the military decoration rack kiosk that specifies a plurality of military ribbons or military medals, wherein the specified plurality of military ribbons and the military medals are used for creating a military decoration rack design, wherein the specification of the plurality of military ribbons and the military medals are received from a user via an input interface of a first military decoration rack kiosk of a plurality of military decoration rack kiosks, and wherein the military decoration rack kiosk receives the user input that specifies the plurality of military ribbons and the military medals that are to be incorporated into a military decoration rack that is to be generated based on the user input received at the military decoration rack kiosk, the first military decoration rack kiosk further comprising:

a military decoration rack display unit; and a military decoration rack processing unit configured to execute instruction data that has been stored at the data storage unit;

wherein the military decoration rack processing unit is in electronic communication with the data storage unit;

wherein the instruction data includes an input module, an arrangement module, and a display module;

transmitting the instruction data from the data storage unit to the military decoration rack processing unit;

transmitting the decoration data corresponding to the user specified plurality of military ribbons and the military medals from the data storage unit to the military decoration rack processing unit;

translating, at the military decoration rack processing unit executing the received instruction data via the input module under execution of the military decoration rack processing unit, the user input into input data;

transforming, via the arrangement module under execution of the military decoration rack processing unit, the input data, the decoration data, and the regulation data into rack data that defines a military decoration rack corresponding to the user input that specifies the plurality of military ribbons and the military medals;

producing, via the display module under execution of the military decoration rack processing unit, a visual representation of the military decoration rack;

displaying, via the display unit of the military decoration rack kiosk, the visual representation to the user; and transmitting the rack data from the military decoration rack kiosk to a production facility in electronic communication with the first military decoration rack kiosk;

wherein the military decoration rack is later produced at the production facility based on the rack data received from the military decoration rack kiosk.

17. The method of claim 16, wherein the production facility is located remote of the first military decoration rack kiosk.

18. The method of claim 16, wherein the production facility is located proximal the first military decoration rack kiosk.

19. The method of claim 16, wherein the transmitting step comprises:

transmitting the rack data via a communication module of the first military decoration rack kiosk.

20. The method of claim 16, comprising:

receiving additional user input;

revising, in response to the additional user input, the rack data;

producing a revised visual representation of the military decoration rack;

displaying the revised visual representation to the user.

21. The method of claim 16, comprising:

storing the input data in a data storage unit in electronic communication with the first military decoration rack kiosk.

22. The method of claim 21, comprising:

retrieving the input data from a second military decoration rack kiosk in electronic communication with the data storage unit.

23. The method of claim 16, further comprising:

displaying a visualization of a decoration on the military decoration rack display unit in response to the user entering a partial description of the specified plurality of military ribbons and the military medals referenced in decoration data.

* * * * *